UNITED STATES PATENT OFFICE 2,634,262

PYRAZOLONE MONOAZO DYESTUFFS

Hans-Frank Piepenbrink, Leverkusen-Wiesdorf, and Otto Bayer, Leverkusen-Bayerwerk, Germany, assignors to Farbenfabriken Bayer, Leverkusen, Germany No Drawing. Application October 2, 1951, Serial No. 249,398. In Germany October 19, 1950

5 Claims. (Cl. 260—163)

The present invention relates to new monoazo dyestuffs and to a process of making these dyestuffs; more particularly it relates to monoazo dyestuffs of the general formula:

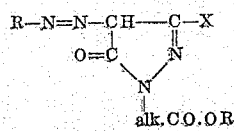

In this formula R stands for an aromatic radical of the benzene series free from sulfonic and carboxyl groups, alk means an alkylene radical, $OR_1$ stands for the radical of an alcohol, and X means alkyl or phenyl.

These new dyestuffs are obtainable e. g. by coupling diazotized aromatic amines free from sulfonic and carboxyl groups with 1-cyanoalkyl pyrazolones and converting the dyestuffs thus obtained into the corresponding esters by saponifying the nitrile group and esterifying the carboxyl group formed thereby. It is of advantage to carry out saponification and esterification in one process by heating one mole of dyestuff with a mixture of 2-10 moles of alcohol and one mole of sulfuric acid for several hours to 100–200° C. Mostly the dyestuff esters are obtained in a quantitative yield.

The dyestuff esters may also be obtained by first converting the 1-cyanoalkyl pyrazolones into the corresponding carboxylic acids by saponification of the nitrile groups, coupling these carboxylic acids with aromatic diazo compounds free from sulfonic and carboxyl groups, and finally esterifying the carboxyl group of the dyestuff thus obtained with alcohols at higher temperatures.

Finally the process of making the new dyestuffs may be carried out in such a way that first the 1-cyanoalkyl pyrazolones are converted into the corresponding esters by saponifying the nitrile group and esterifying the carboxyl group thus formed and that finally these esters are coupled with diazo compounds of aromatic amines free from sulfonic and carboxyl groups.

Suitable aromatic amines for the manufacture of the new monoazo dyestuffs are e. g. aniline, toluidines, xylidines, 3-chloro-2-toluidine, mono- and dichloroanilines, o-nitraniline, 4-chloro-2-nitraniline, 3-nitro-4-anisidine, 3-nitro-4-toluidine. As pyrazolone derivatives which can be used in making the new dyestuffs there may be mentioned by way of example 1-(β-cyanoethyl)- or 1-(ω-cyano-isopropyl)-3-methyl- or phenyl-5-pyrazolone as well as the corresponding carboxylic acids and esters derived therefrom. As suitable alcohols for the ester formation there may be quoted methyl alcohol, ethyl alcohol, propyl alcohol (normal and iso), the butyl alcohols, the hexyl, heptyl, and octyl alcohols, or their technical mixtures, ethylene glycol, 1,2-propylene glycol, 1,3-butylene glycol, glycolmono-ethyl or monobutyl ether, the methylcyclohexanols, p-tert. butyl-cyclohexanol, hexahydroresorcinol, tetrahydrofurfuryl alcohol.

The new dyestuffs are yellow and are particularly suited for dyeing lacquers, waxes and plastics. They are distinguished by a good solubility in organic solvents, especially in aromatic hydrocarbons and in esters. An enhanced solubility is displayed by mixtures of the new dyestuff esters, e. g. mixtures of isoheptyl and isooctyl esters. The dyestuffs, particularly those obtained from the diazo compounds of o-nitraniline or its derivatives, show a very good fastness to light and sublimation. The shades are very clear and brilliant.

The present invention is illustrated by the following examples, the parts being by weight; it is, however, not limited thereto:

Example 1

20 parts of o-nitraniline are stirred for one hour with 300 parts of water. Now 44 parts of hydrochloric acid (19.5° Bé.) are added; the mixture is stirred for further 30 minutes while adding 200 parts of ice and all at once a solution of 10.5 parts of sodium nitrite in 30 parts of water is added; then the mixture is stirred for 20 minutes and the excess of nitrous acid removed by means of amidosulfonic acid. This diazo solution is run with stirring in a solution consisting of 22 parts of 1-cyano-ethyl-3-methyl-5-pyrazolone, 33 parts of sodium carbonate, 500 parts of water and 150 parts of ice. The mixture is stirred for another hour and the dyestuff is filtered by suction. Weight of paste: 90 parts; dry weight: 40.3 parts.

For saponification and simultaneous esterification 40.3 parts of the above dyestuff are added to a solution of 74 parts of n-butanol and 14 parts of sulfuric acid monohydrate and this suspension is refluxed for 7 hours; after two hours all suspended particles have passed into solution. After addition of 200 parts of ice the mixture is neutralized with 10.6 parts of sodium carbonate and the excess butanol is removed by blowing in steam. On cooling 46 parts of butyl ester of the dyestuff crystallize; M. P. 96–98° C. The dyestuff is very well soluble in lacquers, esters and aromatic hydrocarbons.

In this example n-butanol may be replaced e. g. by any aliphatic or hydroaromatic alcohol. The dyestuffs thus obtained show partly very good solubilities in organic solvents. The temperatures of esterification are preferably 110–170° C. The following table shows various dyestuff esters of the type:

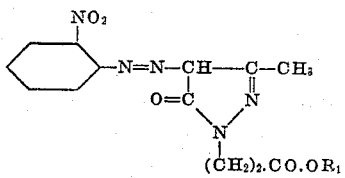

and their melting points.

—$OR_1$ is the radical of one of the following alcohols:

| | M. P. °C. |
|---|---|
| Glycolchlorhydrine | 135–136 |
| Ethyl alcohol | 112 |
| Isopropyl alcohol | 101–102 |
| Isobutyl alcohol | 85–90 |
| Prim. isoheptyl alcohol | 70–71 |
| Sec. isoheptyl alcohol | 112–114 |
| Prim. isooctyl alcohol | 54–56 |
| Ethylene glycol | 92–96 |
| Glycolmonoethyl ether | 120–122 |
| Glycolmonobutyl ether | 60–64 |
| Diethylene glycol | 107–109 |
| 1,2-propylene glycol | 115–117 |
| o-Methyl-cyclohexanol | 97–99 |
| m-Methyl-cyclohexanol | 122–124 |
| p-Tert. butyl-cyclohexanol | 150–151 |
| Hexahydroresorcinol | 125–130 |
| Tetrahydrofurfuryl alcohol | 110–112 |

Example 2

15.5 parts of o-toluidine are dissolved in 400 parts of water and 44 parts of concentrated hydrochloric acid (19.5° Bé.). 200 parts of ice and a solution of 10.5 parts of sodium nitrite in 50 parts of water are added; the mixture is stirred for 20 minutes and the nitrous acid is removed by means of amidosulfonic acid. This diazo solution is poured into a solution of 22 parts of 1-cyano-ethyl-3-methyl-5-pyrazolone in 400 parts of water and 200 parts of ice. After one hour the formed dyestuff is filtered by suction and the moist paste is added to a mixture of 74 parts of n-butanol and 28 parts of sulfuric acid monohydrate and the suspension is refluxed for 7 hours. The solution is then cooled to 0° C. After 48 hours the main portion of the dyestuff has crystallized; M. P. 59–61° C. If n-butanol is replaced in the esterification by glycol mono-ethyl ether a dyestuff ester melting at 83–84° C. is obtained. The dyestuff ester obtained when using glycol monobutyl ether is liquid and miscible with practically all organic solvents.

Example 3

20.6 parts of 3-chloro-2-toluidine are dissolved in 300 parts of water, 200 parts of ice and 44 parts of concentrated hydrochloric acid (19.5° Bé.). To this solution a solution of 10.6 parts of sodium nitrite in 100 parts of water is added; after 30 minutes' stirring of the mixture the excess nitrous acid is destroyed by means of amidosulfonic acid. This diazo solution is added with stirring to a solution of 22 parts of 1-cyanoethyl-3-methyl-5-pyrazolone in 500 parts of water, 150 parts of ice, and 33 parts of sodium carbonate. After one hour the dyestuff is filtered by suction; dry weight: 41 parts.

The dyestuff is converted into the corresponding n-butyl ester by adding 41 parts of the above dyestuff to a mixture of 74 parts of n-butyl alcohol and of 14 parts of sulfuric acid monohydrate and refluxing this mixture for 15 hours. Then ice and water are added, and the mixture is neutralized with 11 parts of sodium carbonate; excess butyl alcohol is distilled off in vacuo. After cooling 44 parts of crystallized butyl ester of the dyestuff are obtained; M. P. 59–60° C. It is very easily soluble in alcohol, benzene, esters and lacquers.

Example 4

20 parts of o-nitraniline are diazotized as in Example 1 and coupled with a solution of 27 parts of 1-(ω-carboxy-iso-propyl)-3-methyl-5-pyrazolone in 500 parts of water, 150 parts of ice and 50 parts of sodium carbonate. After one hour the dyestuff obtained is filtered by suction; dry weight: 47 parts. The dyestuff-carboxylic acid thus obtained is suspended in 350 parts of n-butanol and the suspension is saturated with hydrogen chloride. The temperature rises to 45° C. Thereafter the solution is slowly heated to 60° C. After 5 hours' heating the mixture is diluted with ice and water, neutralized with sodium carbonate and the excess butanol is blown off by means of steam. The n-butyl ester of the dyestuff melts at 80–82° C. It has a good solubility in alcohols, esters, and aromatic hydrocarbons.

1-(ω-carboxy-isopropyl)-3-methyl-5-pyrazolone is obtained by refluxing 100 parts of 1-(ω-cyano-isopropyl)-3-methyl-5-pyrazolone with 800 parts of concentrated hydrochloric acid (19.5° Bé.) for 2 hours. After evaporating the reaction mixture in vacuo at 70° C. the residue is subjected to fractional crystallization from glacial acetic acid. 90 parts of 1-(ω-carboxy-isopropyl)-3-methyl-5-pyrazolone of M. P. 209° C. are obtained.

Example 5

20.6 parts of 3-chloro-2-toluidine are diazotized according to Example 3 and coupled with 33.7 parts of 1-(β-carboxy-ethyl)-3-phenyl-5-pyrazolone. 50 parts of dyestuff are obtained which are esterified—as described in Example 4—with n-butyl alcohol and hydrogen chloride for 7 hours at 80° C. The n-butyl ester of the dyestuff melts at 73–75° C.

1-(β-carboxy-ethyl)-3-phenyl-5-pyrazolone is obtained by refluxing 187 parts of 1-cyano-ethyl-3-phenyl-5-pyrazolone with 900 parts of concentrated hydrochloric acid (19.5° Bé.) for 2.5 hours. The reaction mixture is evaporated in vacuo and the residue subjected to fractional crystallization from glacial acetic acid. Yield: 165 parts of M. P. 185–186° C.

Example 6

20 parts of o-nitraniline are diazotized according to Example 1 and coupled with a solution of 33 parts of 1-(β-carbobutoxy-ethyl)-3-methyl-5-pyrazolone in 1000 parts of water, 200 parts of ice, 35 parts of sodium carbonate and 300 parts of potassium chloride. The mixture is stirred over night, the dyestuff is filtered by suction and crystallized from ligroine. 40 parts of the dyestuff as described in Example 1 of the melting point 96° C. are obtained.

In similar manner a lacquer dyestuff melting at 132° C. is obtained from 4-chloro-2-nitraniline and 1-(β-carbobutoxy-ethyl)-3-methyl-5-pyrazolone. If 2-nitraniline is coupled with 1-(β-carb-ethoxy-ethyl)-3-methyl-5-pyrazolone a lacquer dyestuff melting at 112° C. is obtained. All the dyestuffs described in this example readily dissolve in aromatic hydrocarbons and esters.

To prepare 1-(β-carbobutoxy-ethyl)-3-methyl-5-pyrazolone 151 parts of 1-cyano-ethyl-3-methyl-5-pyrazolone are refluxed with 1000 parts of concentrated hydrochloric acid (19.5° Bé.) for two hours. Thereafter the reaction mixture is evaporated to dryness in vacuo; 350 parts of n-butanol are added to the residue and the suspension is saturated at 40° C. with hydrogen chloride. After 10 hours the ammonium chloride formed is filtered off, the butanol is distilled off in vacuo, and the remaining syrup is dissolved in chloroform. The chloroform solution is washed acid-free by shaking it with an aqueous suspension of calcium carbonate. After distilling off the chloroform the crystallized 1-(β-carbobutoxy-ethyl)-3-methyl-5-pyrazolone is obtained. It is re-crystallized from ligroine and melts at 52-53° C. Yield: 127 parts. In analogous manner 1-(β-carbethoxy-ethyl)-3-methyl-5-pyrazolone is prepared; M. P. 106° C.

We claim:

1. Monoazo dyestuffs corresponding to the general formula:

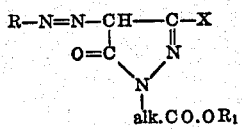

wherein R stands for an aromatic radical of the benzene series free from sulfonic and carboxyl groups, alk stands for an alkylene radical, $OR_1$ stands for the radical of an alcohol, and X stands for a radical of the group consisting of alkyl and phenyl.

2. Monoazo dyestuffs corresponding to the general formula:

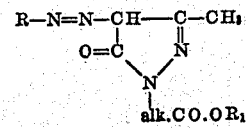

wherein R stands for an aromatic radical of the benzene series free from sulfonic and carboxyl groups, alk stands for an alkylene radical, and $OR_1$ stands for the radical of an alcohol.

3. Monoazo dyestuffs corresponding to the general formula:

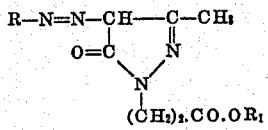

wherein R stands for an aromatic radical of the benzene series free from sulfonic and carboxyl groups, and $OR_1$ stands for the radical of an alcohol.

4. Monoazo dyestuffs corresponding to the general formula:

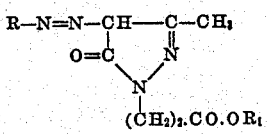

wherein R stands for an aromatic radical of the benzene series free from sulfonic and carboxyl groups, and $OR_1$ stands for the radical of a butyl alcohol.

5. The monoazo dyestuff of the formula:

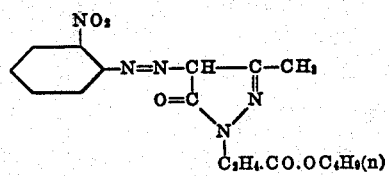

being a yellow crystalline compound melting at 96-98° C.

HANS-FRANK PIEPENBRINK.
OTTO BAYER.

REFERENCES CITED

The following references are of record in the file of this patent:

UNITED STATES PATENTS

| Number | Name | Date |
|---|---|---|
| 2,060,563 | Fischer | Nov. 10, 1936 |
| 2,289,210 | Reynolds et al. | July 7, 1942 |